(12) United States Patent
Tuniewicz et al.

(10) Patent No.: US 7,645,159 B1
(45) Date of Patent: Jan. 12, 2010

(54) MECHANISM FOR INSTALLING AND REMOVING A COMPONENT FROM A PANEL

(76) Inventors: Robert M. Tuniewicz, 14 Remsen Ct., Mt. Sinai, NY (US) 11766; Gilbert D. Talamo, P.O. Box 434, Great River, NY (US) 11739

( * ) Notice: Subject to any disclaimer, the term of this patent is extended or adjusted under 35 U.S.C. 154(b) by 0 days.

(21) Appl. No.: 12/156,204

(22) Filed: May 30, 2008

(51) Int. Cl.
*H01R 13/66* (2006.01)

(52) U.S. Cl. .................................... 439/535

(58) Field of Classification Search ............. 439/534, 439/131, 373, 467, 535; 174/48, 50
See application file for complete search history.

(56) References Cited

U.S. PATENT DOCUMENTS

| 5,008,491 | A  | * | 4/1991  | Bowman ............... 174/489 |
| 5,575,668 | A  | * | 11/1996 | Timmerman ........... 439/131 |
| 7,364,443 | B1 | * | 4/2008  | McGinnis et al. ....... 439/131 |
| 7,459,631 | B2 | * | 12/2008 | Nakayama et al. ...... 174/50 |

* cited by examiner

*Primary Examiner*—Jean F Duverne
(74) *Attorney, Agent, or Firm*—Richard L. Miller

(57) ABSTRACT

A quick-connector or replaceably attaching at least one electrical component to an electrical box without a need for screws and its method of use. The connector includes a panel and an apparatus. The panel is pivotally connected to the electrical box. The apparatus replaceably attaches the at least one electrical component to the panel without the need for the screws.

12 Claims, 4 Drawing Sheets

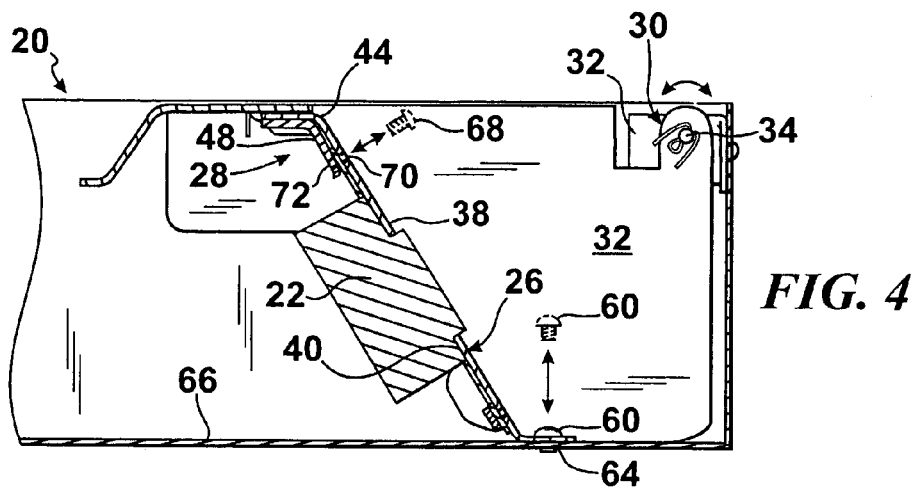
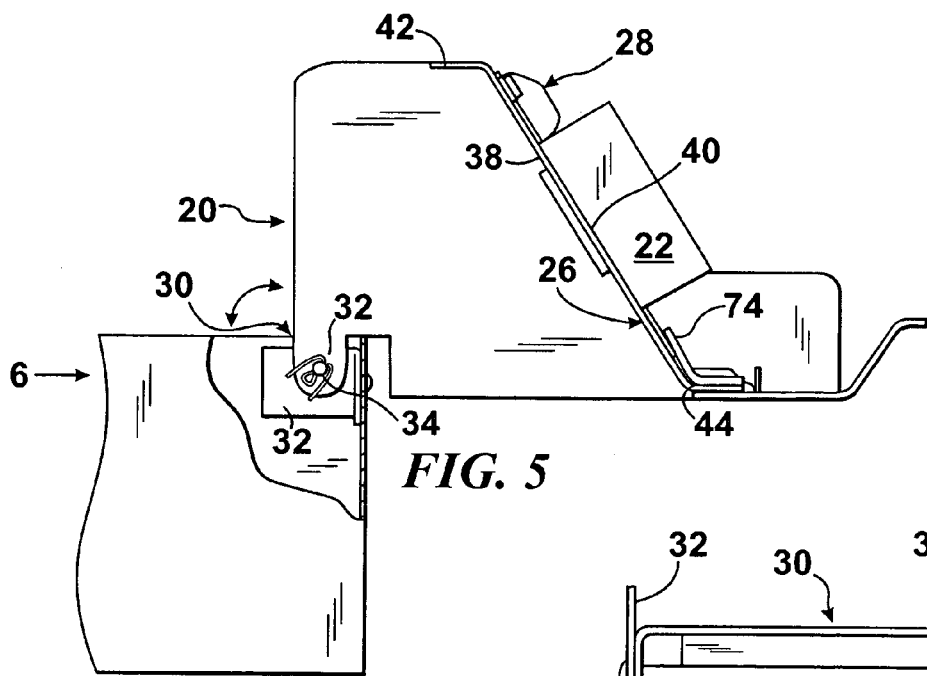
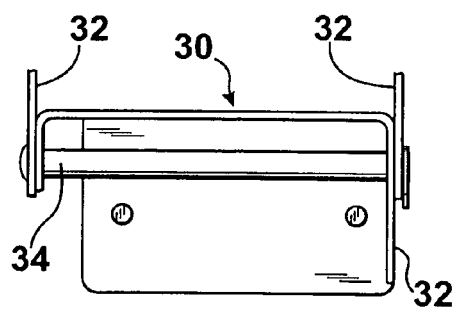

MECHANISM FOR INSTALLING AND REMOVING A COMPONENT FROM A PANEL

1. CROSS REFERENCES TO RELATED APPLICATIONS

The instant application contains subject matter disclosed in applicant's provisional Patent Application accorded Appl. No. 60/932,006, filed on May 29, 2007. As such, it is respectfully requested that this Application be accorded the priority date of the provisional application and remain a permanent part of the file history during the prosecution of the instant application and during any subsequent action thereof.

2. BACKGROUND OF THE INVENTION

A. Field of the Invention

The embodiments of the present invention relate to a connector for replaceably attaching a component to a box, and more particularly, the embodiments of the present invention relate to a quick-connector for replaceably attaching at least one electrical component to an electrical box without a need for screws and method of use.

3. SUMMARY OF THE INVENTION

Thus, an object of the embodiments of the present invention is to provide a quick-connector for replaceably attaching at least one electrical component to an electrical box without a need for screws and method of use, which avoids the disadvantages of the prior art.

Briefly stated, another object of the embodiments of the present invention is to provide a quick-connector or replaceably attaching at least one electrical component to an electrical box without a need for screws and method of use. The connector includes a panel and an apparatus. The panel is pivotally connected to the electrical box. The apparatus replaceably attaches the at least one electrical component to the panel without the need for the screws.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

4. BRIEF DESCRIPTION OF THE DRAWING

The figures of the drawing are briefly described as follows:

FIG. 4 is an enlarged diagrammatic cross sectional view taken along LINE 4-4 in FIGS. 1 and 2, with parts broken away;

FIG. 5 is an enlarged diagrammatic side elevational view taken generally in the direction of ARROW 5 in FIG. 3;

FIG. 6 is a diagrammatic rear view taken generally in the direction of ARROW 6 in FIG. 5;

Figure 9:
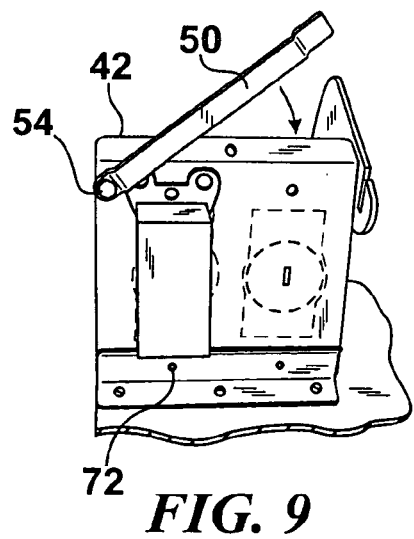
Figure 10:
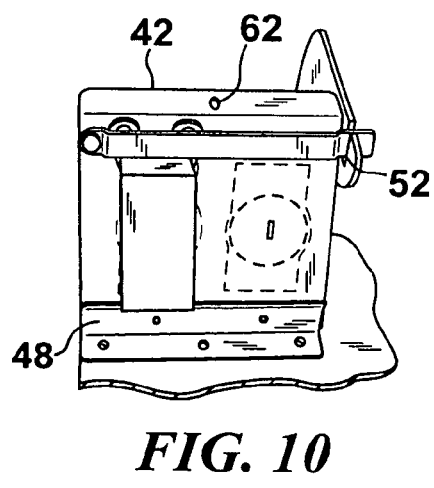

FIG. 9 is a diagrammatic perspective view of the second step of the quick-connector of the embodiments of the present invention replaceably attaching at least one electrical component to an electrical box without a need for screws; and FIG. 10 is a diagrammatic perspective view of the fourth step of the quick-connector of the embodiments of the present invention replaceably attaching at least one electrical component to an electrical box without a need for screws.

5. LIST OF REFERENCE NUMERALS UTILIZED IN THE DRAWING

A. General 20 quick-connector of embodiments of present invention for replaceably attaching at least one electrical component 22 to electrical box 24 without need for screws
22 at least one electrical component
24 electrical box

B. Overall Configuration of Quick-Connector 20

26 panel for pivotally connecting to electrical box 24
28 apparatus for replaceably attaching at least one electrical component 22 to panel 26 without need for screws

C. Specific Configuration of Panel 26

30 pivoting mechanism of panel 26 for pivotally connecting panel 26 to electrical box 24
32 pair of leaves of pivoting mechanism 30, one of which is for affixing to electrical box 24 for allowing panel 26 to pivot relative to electrical box 24
34 pivot pin of pivoting mechanism 30
36 plurality of different knockouts of panel 26 for allowing different ones of at least one electrical component 22 to cooperate with panel 26
38 front surface of panel 26 for facing in direction of at least one electrical component 22
40 rear surface of panel 26
42 bottom edge of panel 26
44 top edge of panel 26

D. Specific Configuration of Apparatus 28 and Method of Use 46 latch arrangement of apparatus 28
48 receiving bracket of latch arrangement 46 of apparatus 28
50 lever arm of latch arrangement 46 of apparatus 28
52 stop lock of latch arrangement 46 of apparatus 28
54 pivot pin of latch arrangement 46 of apparatus 28
56 one set of ears of at least one electrical component 22
58 other set of ears of at least one electrical component 22
60 fastening screw
62 clearance hole in the bottom edge 42 of the panel 26
64 threaded bore in a back panel 66 of the electrical box 24
66 back panel of the electrical box 24

68 optional screw
70 clearance hole
72 threaded bore 72 of a back portion 74 of receiving bracket 48
74 back portion of receiving bracket 48

6. DETAILED DESCRIPTION OF THE PREFERRED EMBODIMENTS

A. General

Figure 1:
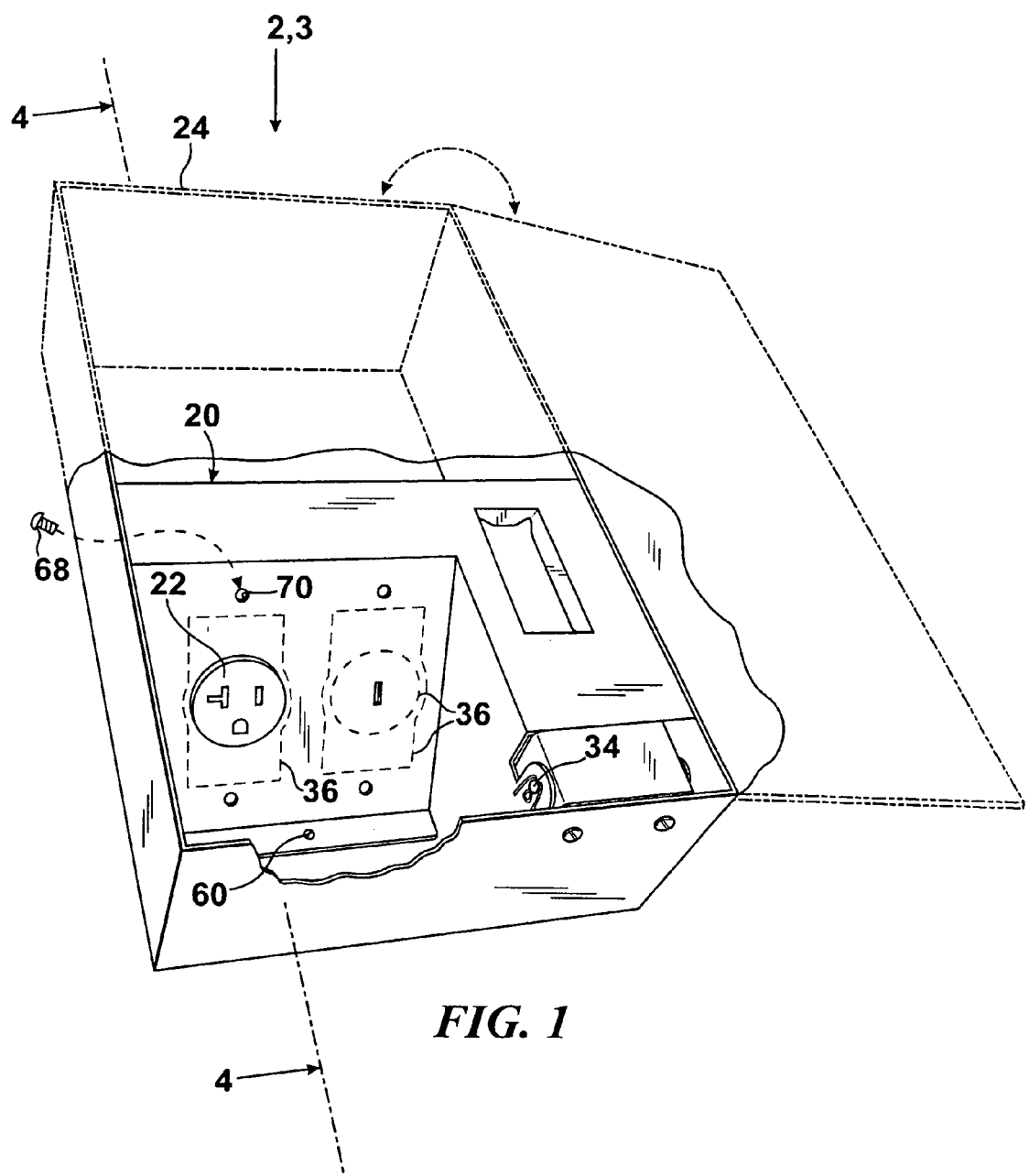
FIG. 1 is a diagrammatic perspective view of the quick-connector of the embodiments of the present invention replaceably attaching at least one electrical component to an electrical box without a need for screws.

Referring now to the figures, in which like numerals indicate like parts, and particularly to FIG. 1, which is a diagrammatic perspective view of the quick-connector of the embodiments of the present invention replaceably attaching at least one electrical component to an electrical box without a need for screws, the quick-connector of the embodiments of the present invention is shown generally at 20 for replaceably attaching at least one electrical component 22 to an electrical box 24 without a need for screws.

B. The Overall Configuration of the Quick-Connector 20

Figure 2:
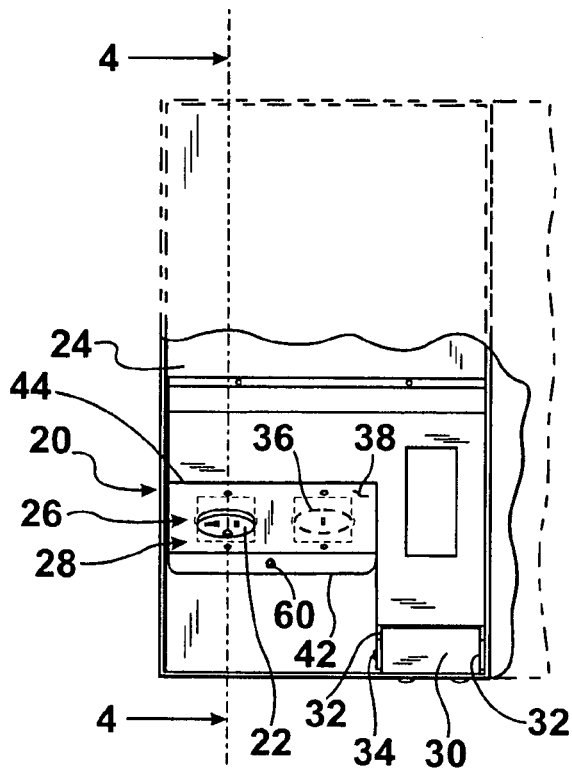
FIG. 2 is a reduced diagrammatic top plan view taken in the direction of ARROW 2 in FIG. 1.
Figure 3:
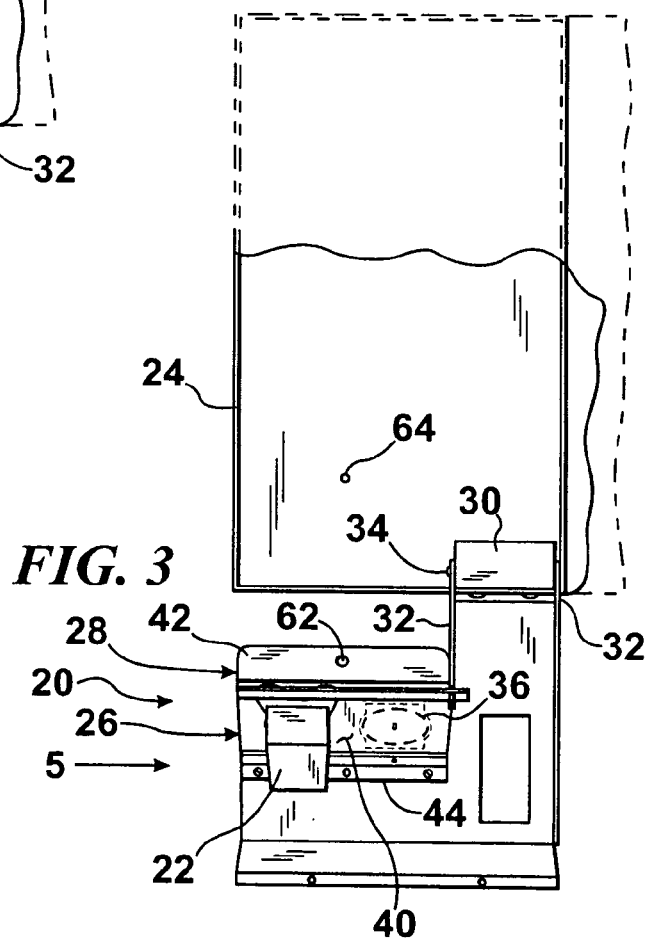
FIG. 3 is a reduced diagrammatic top plan view taken in the direction of ARROW 3 in FIG. 1 but with the quick-connector of the embodiments of the present invention swung out.

The overall configuration of the quick-connector 20 can best be seen in FIGS. 2-6, which are, respectively, a reduced diagrammatic top plan view taken in the direction of ARROW 2 in FIG. 1, a reduced diagrammatic top plan view taken in the direction of ARROW 3 in FIG. 1 but with the quick-connector of the embodiments of the present invention swung out, an enlarged diagrammatic cross sectional view taken along LINE 4-4 in FIGS. 1 and 2, an enlarged diagrammatic side elevational view taken generally in the direction of ARROW 5 in FIG. 3, and a diagrammatic rear view taken generally in the direction of ARROW 6 in FIG. 5, and as such, will be discussed with reference thereto.

The quick-connector 20 comprises a panel 26 for pivotally connecting to the electrical box 24, and an apparatus 28 for replaceably attaching the at least one electrical component 22 to the panel 26 without the need for the screws.

C. The Specific Configuration of the Panel 26

The panel 26 comprises a pivoting mechanism 30. The pivoting mechanism 30 of the panel 26 is for pivotally connecting the panel 26 to the electrical box 24.

The pivoting mechanism 30 comprises a pair of leaves 32. The pair of leaves 32 of the pivoting mechanism 30 are pivotally connected to each other by a pivot pin 34. One leaf 32 of the pivoting mechanism 30 is affixed to the panel 26, while the other leaf 32 of the pivoting mechanism 30 is for affixing to the electrical box 24 for allowing the panel 26 to pivot relative to the electrical box 24.

The panel 26 further comprises a plurality of different knockouts 36. The plurality of different knockouts 36 of the panel 26 are for allowing different ones of the at least one electrical component 22 to cooperate with the panel 26.

The panel 26 further comprises a front surface 38, a rear surface 40, a bottom edge 42, and a top edge 44. The front surface 38 of the panel 26 is for facing in a direction of the at least one electrical component 22, while the rear surface 40 of the panel 26 faces opposite thereto.

D. The Specific Configuration of the Apparatus 28 and Method of Use

The specific configuration of the apparatus 28 and method of use can best be seen in FIGS. 7-10, which are, respectively, a diagrammatic perspective view of the first step of the quick-connector of the embodiments of the present invention replaceably attaching at least one electrical component to an electrical box without a need for screws, a diagrammatic perspective view of the first step of the quick-connector of the embodiments of the present invention replaceably attaching at least one electrical component to an electrical box without a need for screws, a diagrammatic perspective view of the second step of the quick-connector of the embodiments of the present invention replaceably attaching at least one electrical component to an electrical box without a need for screws, and a diagrammatic perspective view of the fourth step of the quick-connector of the embodiments of the present invention replaceably attaching at least one electrical component to an electrical box without a need for screws, and as such, will be discussed with reference thereto.

The apparatus 28 comprises a latch arrangement 46. The latch arrangement 46 of the apparatus 28 comprises a receiving bracket 48, a lever arm 50, and a stop lock 52.

The receiving bracket 48 of the latch arrangement 46 of the apparatus 28 extends transversely along the rear surface 40 of the panel 26, in proximity to the top edge 44 of the panel 26, and opens towards the bottom edge 42 of the panel 26.

The lever arm 50 of the latch arrangement 46 of the apparatus 28 is pivotally connected by a pivot pin 54 to the rear surface 40 of the panel 26, in proximity to the bottom edge 42 of the panel 26.

The stop lock 52 of the latch arrangement 46 of the apparatus 28 is disposed on the rear surface 40 of the panel 26, oppositely to the pivot pin 54 of the of the apparatus 28, and in proximity to the bottom edge 42 of the panel 26.

Figure 7:
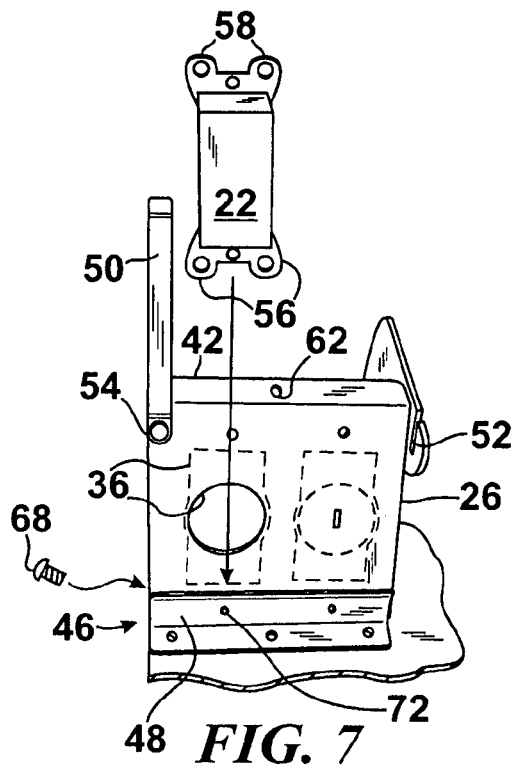
FIG. 7 is a diagrammatic perspective view of the first step of the quick-connector of the embodiments of the present invention replaceably attaching at least one electrical component to an electrical box without a need for screws.
Figure 8:
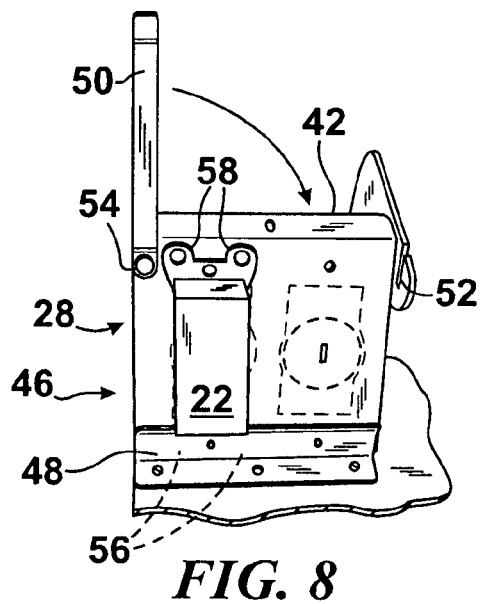
FIG. 8 is a diagrammatic perspective view of the first step of the quick-connector of the embodiments of the present invention replaceably attaching at least one electrical component to an electrical box without a need for screws.

STEP 1: As shown in FIG. 7, pivot the panel 26 outwardly relative to the electrical box 24;

STEP 2: As further shown in FIG. 7, install the at least one electrical component 22 in an associated knockout 36 in the panel 26, with one set of ears 56 of the at least one electrical component 22 being dropped-in and captured in the receiving bracket 48 of the latch arrangement 46 of the apparatus 28;

STEP 3: As shown in FIGS. 8 and 9, pivot the lever arm 50 of the latch arrangement 46 of the apparatus 28 towards the stop lock 52 of the latch arrangement 46 of the apparatus 28;

STEP 4: As shown in FIG. 10, close the lever arm 50 of the latch arrangement 46 of the apparatus 28 into the stop lock 52 of the latch arrangement 46 of the apparatus 28 while capturing the other set of ears 58 of the at least one electrical component 22, thereby locking the at least one electrical component 22 in the panel 26;

STEP 5: Pivot the panel 26 back into the electrical box 24, and insert a fastening screw 60 thru a clearance hole 62 in the bottom edge 42 of the panel 26 into a threaded bore 64 in a back panel 66 of the electrical box 24 to firmly secure the panel 26 to the back panel 66, as further illustrated in FIG. 4; and STEP 6: If so desired or require by electrical codes, a technician may install an optional screw 68 thru a clearance hole 70 into a threaded bore 72 of a back portion 74 of receiving bracket 48.

E. The Conclusions

It will be understood that each of the elements described above or two or more together may also find a useful application in other types of constructions differing from the types described above.

While the embodiments of the present invention have been illustrated and described as embodied in a quick-connector for replaceably attaching at least one electrical component to an electrical box without a need for screws and its method of use, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A quick-connector for replaceably attaching at least one electrical component to an electrical box without a need for screws, comprising:
   a) a panel; and
   b) means for replaceably attaching the at least one electrical component to said panel without the need for the screws;
wherein said panel is for pivotally connecting to the electrical box;
wherein said panel comprises:
   c) a front surface:
   d) a rear surface:
   e) a bottom edge; and
   f) a top edge;
wherein said means includes a latch arrangement;
wherein said latch arrangement of said means comprises a receiving bracket; and
wherein said receiving bracket of said latch arrangement of said means is for receiving and capturing one set of ears of the at least one electrical component;
wherein said latch arrangement of said means comprises a lever arm;
wherein said latch arrangement of said means comprises a stop lock; and
wherein said lever arm of said latch arrangement of said means is pivoted towards said stop lock of said latch arrangement of said means and closes into said stop lock of said latch arrangement of said means while capturing the other set of ears of the at least one electrical component, thereby locking said at least one electrical component in said panel.

2. The connector of claim 1, wherein said panel comprises a pivoting mechanism; and
wherein said pivoting mechanism is for pivotally connecting said panel to the electrical box.

3. The connector of claim 1, wherein said pivoting mechanism comprises a pair of leaves;
wherein said pair of leases of said pivoting mechanism are pivotally connected to each other by a pivot pin; and
wherein one leaf of said pivoting mechanism is affixed to said panel, while the other leaf of said pivoting mechanism is for affixing to the electrical box for allowing said panel to pivot outwardly and inwardly relative to the electrical box.

4. The connector of claim 1, wherein said panel comprises a plurality of different knockouts; and
wherein said plurality of different knockouts of said panel are for allowing different ones of the at least one electrical component to cooperate with said panel.

5. The connector of claim 1, wherein said front surface of said panel is for facing in a direction of the at least one electrical component, while said rear surface of said panel faces opposite thereto.

6. The connector of claim 1, wherein said receiving bracket of said latch arrangement of said means extends transversely along said rear surface of said panel.

7. The connector of claim 1, wherein said receiving bracket of said latch arrangement of said means is disposed in proximity to said top edge of said panel.

8. The connector of claim 1, wherein said receiving bracket of said latch arrangement of said means opens towards said bottom edge of said panel.

9. The connector of claim 1, wherein said stop lock of said latch arrangement of said means is disposed on said rear surface of said panel.

10. The connector of claim 1, wherein said stop lock of said latch arrangement of said means is disposed oppositely to said pivot pin of said means.

11. The connector of claim 1, wherein said stop lock of said latch arrangement of said means is disposed in proximity to said bottom edge of said panel.

12. A quick-connector for replaceably attaching at least one electrical component to an electrical box without a need for screws, comprising:
   a) a panel; and
   b) means for replaceably attaching the at least one electrical component to said panel without the need for the screws;
wherein said panel is for pivotally connecting to the electrical box;
wherein said panel comprises:
   c) a front surface;
   d) a rear surface;
   e) a bottom edge; and
   f) a top edge;
wherein said means includes a latch arrangement;
wherein said latch arrangement of said means comprises a receiving bracket; and
wherein said receiving bracket of said latch arrangement of said means is for receiving and capturing one set of ears of the at least one electrical component;
wherein said latch arrangement of said means comprises a lever arm;
wherein said lever arm of said latch arrangement of said means is pivotally connected by a pivot pin to said rear surface of said panel; and
wherein said lever arm of said latch arrangement of said means is disposed in proximity to said bottom edge of said panel.

* * * * *